United States Patent [19]

Base

[11] 4,343,483
[45] Aug. 10, 1982

[54] WOOD TOTER

[76] Inventor: Leonard C. Base, Rte. #3, Kingman, Kans. 67068

[21] Appl. No.: 151,174

[22] Filed: May 19, 1980

[51] Int. Cl.³ .............................................. B62B 1/02
[52] U.S. Cl. .................................... 280/47.26; 280/63
[58] Field of Search ............... 280/47.24, 47.26, 47.33, 280/63; 248/129

[56] References Cited

U.S. PATENT DOCUMENTS

| | | | |
|---|---|---|---|
| 1,825,196 | 9/1931 | McDaniel | 280/47.23 |
| 2,817,538 | 12/1957 | Romang | 280/47.26 |
| 2,896,961 | 7/1959 | Low | 280/47.26 |
| 2,932,103 | 4/1960 | Wright | 280/47.26 X |
| 3,035,847 | 5/1962 | Born | 280/654 |
| 3,827,707 | 8/1974 | Bierman | 280/47.24 X |
| 4,264,081 | 4/1981 | Markham | 280/47.34 X |

FOREIGN PATENT DOCUMENTS 777422  2/1935  France ............... 280/47.27

Primary Examiner—Joseph F. Peters, Jr.
Assistant Examiner—Donald W. Underwood
Attorney, Agent, or Firm—John H. Widdowson

[57] ABSTRACT

A wheeled carrier for hauling logs having a frame rotatably supporting a pair of wheels an arcuate panel member attached to the frame, and a handle for gripping the wheeled carrier.

3 Claims, 7 Drawing Figures

WOOD TOTER

BACKGROUND OF THE INVENTION

1. Field of the Invention:

This invention is related to a wood toter. More specifically, this invention provides a wheeled carrier for hauling logs or the like.

2. Description of Prior Art:

U.S. Pat. No. 2,896,961 by Low teaches a mobile log caddy. U.S. Pat. No. 1,825,196 by McDaniel illustrates a hand truck having a handle so that the same may be transported from one location to another. U.S. Pat. No. 3,035,847 by Born discloses a wheeled cart having a single handle and wheels so that articles may be carried on the platform disposed between the wheels. None of the foregoing prior art teaches the wheeled cart of this invention.

SUMMARY OF THE INVENTION

This invention accomplishes its desired objects by providing two preferred embodiments of a wheeled cart. One wheeled carrier comprises a frame defined by a continuous generally rectangular rod member configurated into a substantially U-shape having a bottom and a pair of sides, one of said sides extending higher than the other with respect to the bottom. The higher side provides a handle gripped by a user so that a number of logs can be easily transported in the carrier. A panel connects to and essentially traverses the entire length of the frame; and a pair of wheels is supported by the frame and rotatably carried thereby. Another embodiment of the wheeled carrier comprises an elongated arcuate panel including a pair of open ends and having sides essentially symmetrically tapering from a generally central apex position towards the ends. An axis is secured to the panel and has a structure defining an arcuate groove contouring the bottom of the panel wherein the panel lodges. A pair of wheels is supported by the axis and rotatably carried thereby. A handle bar connects to and extends upwardly from the panel to facilitate the operation of the carrier when the same is gripped by the user.

It is an object of the invention to provide a novel wheeled carrier.

Still further objects of the invention reside in the provision of two embodiments of a novel wheeled carrier which can be easily operated and is relatively inexpensive to manufacture.

These together with the various ancillary objects and features which will become apparent as the following description proceeds, are attained by this wheeled carrier, preferred embodiments being shown in the accompanying drawings, by way of example only, wherein;

DETAILED DESCRIPTION OF THE INVENTION

Figure 2:
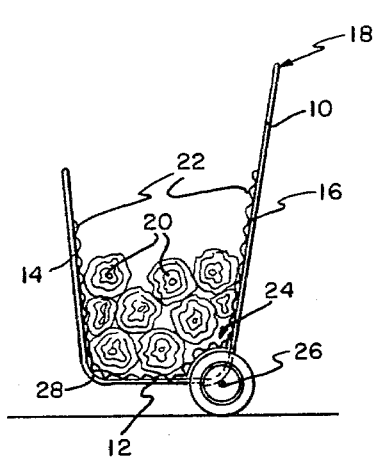
FIG. 2 is a side elevational view of the embodiment.
Figure 1:
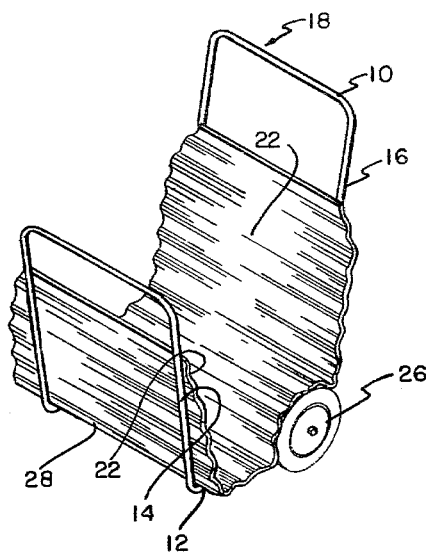
FIG. 1 is a perspective view of one embodiment of the wheeled carrier.
Figure 3:
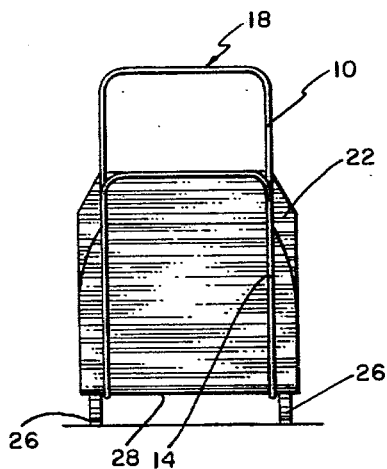
FIG. 3 is a front view of the embodiment.
Figure 4:
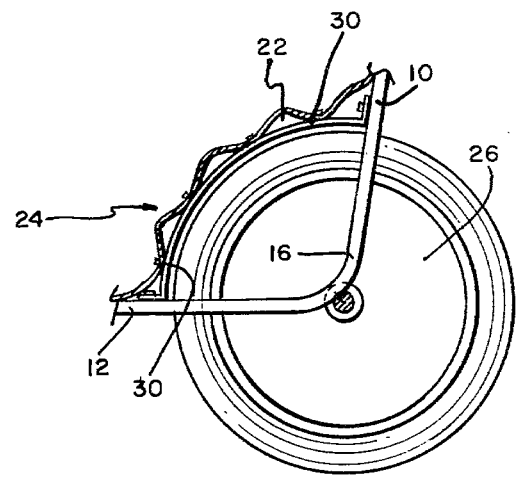
FIG. 4 is a partial exploded view of a wheel attached to the rod frame.

Referring in detail now to the drawings, wherein like reference numerals designate similar parts throughout the various views, and initially in particular to the embodiment of FIGS. 1-4, there is seen an embodiment of the invention including a frame 10 defined by a continuous generally rectangular rod member configurated into a substantially U-shape having a bottom 12, lower side 14, and higher side 16. Side 16, as can be seen, extends higher than side 14 with respect to the bottom 12 and provides a handle generally illustrated as 18, gripped by a user so that a number of logs 20 can be easily transported. An imperforate, corrugated panel 22 connects to and essentially traverses the entire length of the frame 10 while contouring the same. Panel 22 includes a portion generally illustrated as 24 (see FIG. 4), having a vertical section defining an arc which partially shelters a pair of wheels 26 rotatably carried by the rod frame 10 on the bottom 12 in proximity to the side 16 such that the bottom-lower side corner 28 engages the ground when the carrier is in an inoperative position and when the carrier is operative by the gripping and the leaning back of the handle 18 by the user, the bottom-lower side corner 28 disengages the ground and the wheels 26 provide a fulcrum for handling logs 20. This embodiment of the invention also includes a shield member 30 attaching to the arc 24 and the rod frame 10 to additionally partially shelter the wheels 26 and to strengthen the construction of the carrier.

Figure 5:
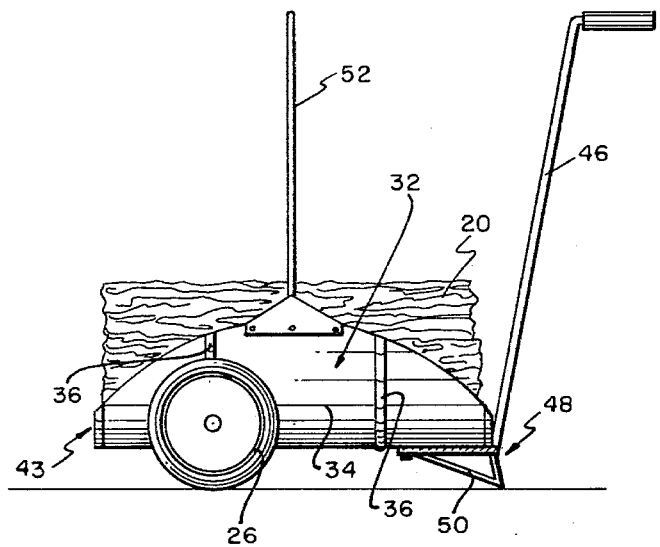
FIG. 5 is a side elevational view of another embodiment of the invention.
Figure 6:
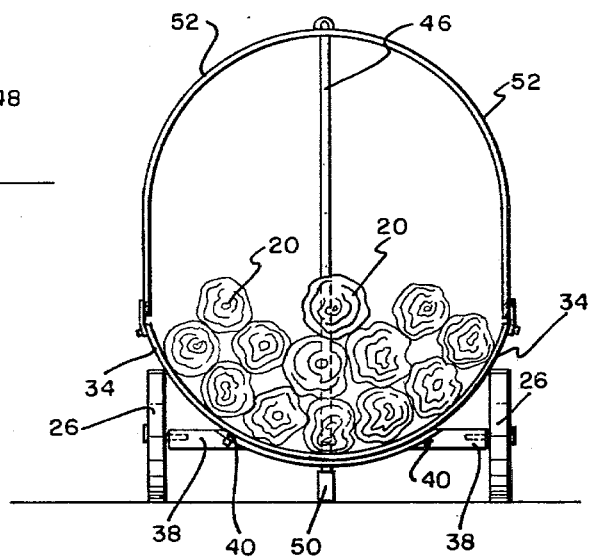
FIG. 6 is a rear elevational view of the other embodiment.
Figure 7:
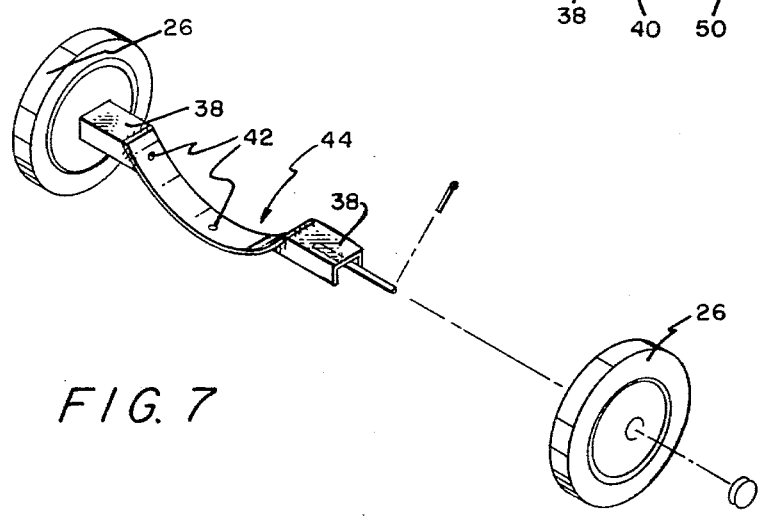
FIG. 7 is an exploded fragmentary perspective view of axis and wheel assembly.

Referring in detail now to FIG. 5-7 for another preferred embodiment of the wheeled toter, there is seen an elongated arcuate panel generally illustrated as 32, including a pair of open ends and having sides 34 essentially symmetrically tapering from a generally central apex position towards the ends. Band members 36 traverse the outside of the panel and is secured thereto to strengthen the panel 32 and prevent the sides of same from buckling. Panel 32 has a plurality of panel apertures. Axis 38 is secured to the panel 32 by inserting fastener means 40 through the panel apertures and axis aperture 42 (see FIG. 7). Axis 38 is secured to the panel 32 between the central position and end, generally illustrated as 43. Axis 38 has an arcuate groove generally illustrated as 44, contouring the bottom of the panel 32 wherein the panel 32 lodges. Wheels 26 are supported by the axis 38 and rotatably carried thereby. A handle bar 46 connects to the bottom of panel 32 at the other end, generally illustrated as 48, and extends upwardly therefrom to facilitate the operation of the carrier when the handle bar 46 is gripped to lift off the ground a prop means 50 (which is secured to the handle bar 46) in order to roll the wheels 26 of the carrier to haul the logs 20. A rod retention member 52 configurated to a U-shape transverses the panel 32 by having its ends secured to the apices of the sides 34 in order to retard the buckling of the sides 34 when a large number of logs 20 are loaded in the carrier.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A wheeled carrier for hauling logs or the like comprising:

a frame defined by a continuous generally rectangular rod member configured into a substantially U-shape having a bottom and a pair of sides, one of said sides extending higher than the other with respect to said bottom, said higher side providing a handle gripped by a user so that a number of logs can be transported easily in said carrier;

a panel connecting to and essentially traversing the entire length of said frame while contouring the same;

a pair of wheels supported by sold frame and rotatably carried thereby, said panel having a vertical section defining an arc which partially shelters said wheels, and a shield member between said arc and said rod frame and attached thereto to additionally partially shelter said wheels and to strengthen the construction of said carrier.

2. The wheeled carrier of claim 1 wherein said wheels are rotatably carried by said rod frame on said bottom in proximity to said higher side such that the bottom-lower side corner engages the ground when said carrier is in an inoperative position and when the carrier is operative by the gripping and the leaning back of the handle by the user the bottom-lower side corner disengages the ground and said wheels provide a fulcrum for hauling logs.

3. The wheeled carrier of claim 2 wherein said panel is imperforate and corrugated.

* * * * *